(12) United States Patent
Poisel

(10) Patent No.: US 7,557,987 B1
(45) Date of Patent: Jul. 7, 2009

(54) DEVICE FOR RECEIVING OPTICAL SIGNALS WITH A LIGHT GUIDE

(75) Inventor: Hans Poisel, Leinburg (DE)

(73) Assignee: Schleifring und Apparatebau GmbH (DE)

( * ) Notice: Subject to any disclaimer, the term of this patent is extended or adjusted under 35 U.S.C. 154(b) by 1031 days.

(21) Appl. No.: 09/194,049

(22) PCT Filed: Jun. 27, 1997

(86) PCT No.: PCT/DE97/01346

§ 371 (c)(1),
(2), (4) Date: May 6, 1999

(87) PCT Pub. No.: WO98/00936

PCT Pub. Date: Jan. 8, 1998

(30) Foreign Application Priority Data

Jun. 27, 1996 (DE) ................................ 195 25 870

(51) Int. Cl.
*H01S 3/00* (2006.01)
(52) U.S. Cl. .................................................. 359/341.3
(58) Field of Classification Search .................. 359/160, 359/134, 337, 341, 337.2, 337.21, 341.41, 359/341.3
See application file for complete search history.

(56) References Cited

U.S. PATENT DOCUMENTS 3,949,315 A * 4/1976 Zeidler ......................... 359/337
5,506,724 A * 4/1996 Shimizu et al. .......... 359/341.41
5,633,750 A * 5/1997 Nogiwa et al. .......... 359/341.41

(Continued)

FOREIGN PATENT DOCUMENTS

DE      31 40 978      10/1981

(Continued)

OTHER PUBLICATIONS

Desurvire, E., Scientific American, pp. 114-121, Jan. 1992.*

(Continued)

*Primary Examiner*—Deandra M Hughes
(74) *Attorney, Agent, or Firm*—St. Onge Steward Johnston & Reens LLC

(57) ABSTRACT

A device for receiving optical signals comprising a light-guiding object having an irradiation surface for receiving optical signals adjacent to a propagation path along which light primarily travels within the light-guiding means. The light-guiding object is substantially constructed of a synthetic material capable of causing elastic dispersion of optical signals received through the irradiation surface at angles between about 0 and 90 degrees relative to the irradiation surface. The synthetic material is further capable of undergoing a population inversion by energetic excitation. The system further includes an excitation unit for inducing a population inversion within the synthetic material. An optical signal is coupled into the light-guiding means through the irradiation surface resulting in a radiation component of the optical signal in the direction of the propagation path of the light-guiding object due to elastic dispersion of the optical signal caused by the synthetic material. A detector means optically coupled to the light-guiding object detects the amplified optical signal having an emission wavelength that corresponds to the wavelength of the original optical signal. The amplified optical signal is produced by stimulated emission from the synthetic material caused by the radiation component of the optical signal.

6 Claims, 1 Drawing Sheet

U.S. PATENT DOCUMENTS

| | | | | |
|---|---|---|---|---|
| 5,644,423 | A | * | 7/1997 | Iwano .................. 359/337 |
| 5,703,711 | A | * | 12/1997 | Hamada ................ 359/341.41 |
| 5,712,715 | A | * | 1/1998 | Erdogan et al. ............ 359/341 |
| 5,838,488 | A | * | 11/1998 | Kobayashi ............ 359/341.41 |
| 6,650,843 | B1 | * | 11/2003 | Lohr et al. .................. 398/156 |
| 7,010,191 | B2 | * | 3/2006 | Poisel et al. .................. 385/25 |
| 7,286,768 | B2 | * | 10/2007 | Lohr et al. .................. 398/141 |

FOREIGN PATENT DOCUMENTS

| | | | |
|---|---|---|---|
| EP | 0 908 030 | | 5/1997 |
| WO | WO 9719529 A1 | * | 5/1997 |
| WO | 98/00936 | | 1/1998 |
| WO | WO 9800935 A1 | * | 1/1998 |
| WO | WO 9904309 A1 | * | 1/1999 |

OTHER PUBLICATIONS

Kanamori, H. 4th Optoelectronics Conference, Technical Digest, 1783-4, pp. 288-289, Jul. 1992.*

Transient Analysis of Erbium-Doped Fiber Amplifiers, K.Y. Ko, M.S. Demokan, Senior Member, IEEE Photonics Technology Letters vol. 6, No. 12, Dec. 1994, 3 pages.

Second-Order Harmonic Distortion and Optimal Fiber Length in Erbium-Doped Fiber Amplifiers, Cheng-Kuang Liu, Member, IEEE, Jau-Ji Jou, and Fu-Shum Lai, IEEE Photonics Technology Letters, vol. 7, No. 12, Dec. 1995, 3 pages.

Der faseroptische Schleifring, Optische Kommunikation, F&M 103 (1995) 9, 4 pages.

Lexikon der Optik, H. Haferkom, Hrsg., Hanau: Dausien 1988, S. 119, 1, 4 pages.

* cited by examiner

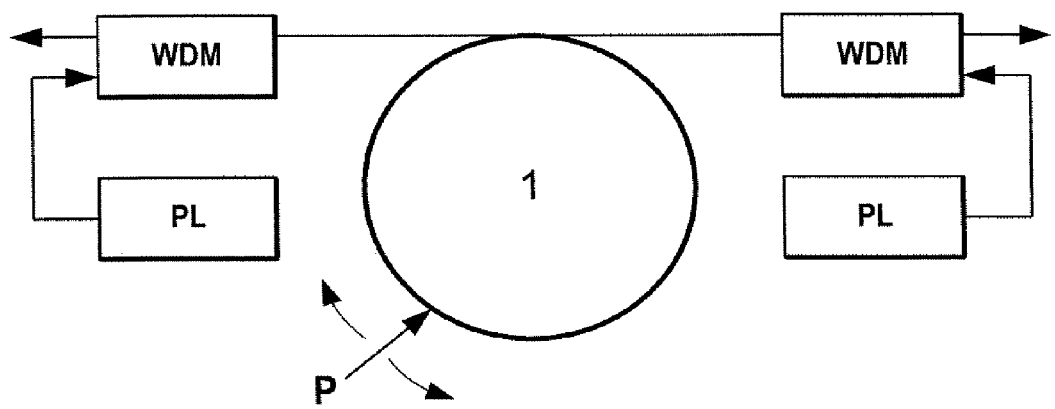

DEVICE FOR RECEIVING OPTICAL SIGNALS WITH A LIGHT GUIDE

FIELD OF THE INVENTION

The invention relates to a device for receiving optical signals, comprising a light-guiding object into which the optical signal to be received may be coupled. The light-guiding object includes a material having an electron array which may be inverted by energetic excitation and which, under stimulated emission, emits light at an emission wavelength which corresponds to the wavelength of the optical signals to be received. For the inversion of the electron state an excitation unit is provided. Moreover, a detector means is coupled to the light-guiding object for optically detecting the light which can be produced by way of the emission processes stimulated by the optical signals which are coupled into the light-guiding object.

PRIOR ART

Devices for receiving optical signals are known from a great number of engineering and scientific applications. All the known optical detector means are based on the problem of converting an electromagnetic radiation into an information unit which is directly related to the optical output signal and which can be processed in engineering terms, i.e. using the means of today's evaluation electronics. An essential aspect of the implementation of high-quality optical detectors is the conversion of electromagnetic radiation into electrical signals as direct as possible, which signals may then be supplied to a further electronic evaluation system. These requirements are satisfied by photo-sensitive semiconductor detectors in particular, where the photons to be detected release electrical charges directly in the semiconductor element, which charges may then be analysed correspondingly.

Even though the known optical detector means, which are designed on the basis of semiconductor materials, normally present only very small limited photo-sensitive detector surfaces it is yet possible to design also large-area detector surfaces by a mosaic-type composition of a plurality of individual detectors. It is moreover fundamentally possible to assemble any detector surface geometry on the basis of optical semiconductor detectors; however, firstly a very great expenditure in terms of circuitry is required to interconnect all the individual detectors with an evaluator unit, and secondly large-area detector surfaces incur very high expenses; thirdly, the response rate decreases as the area is increased.

When, however, it is intended to detect an electromagnetic radiation over an area as large as possible light-absorbing detector surfaces with an appropriately large-size configuration are suitable which are made of a predominantly transparent material into which fluorescent dye molecules are linked. When light now hits on such a detector surface the fluorescent molecules are excited to emit fluorescent light within the absorber layer, which then arrives by reflection at the interfaces within the material, preferably at the lateral marginal zones of the absorber layer, where appropriate optical detectors are provided for conversion into electrical signals.

Optical rotary transmitters in particular benefit from the aforedescribed mechanism, which serve to transfer optical signals between a rotating element and an element remaining stationary in relation to the aforementioned element. An optical emitter means, e.g. a LED, which is moved along the path of a fiber optical waveguide, moves along the fiber optical waveguide which remains stationary, and which is preferably bent to form a closed circle and into which fluorescent molecules are embedded. On account of the lateral radiation into the fiber optical waveguide fluorescent light is produced within the fiber, which is equally guided via internal reflections to the ends of the fiber optical waveguide, where respective optical detector means are provided. With that known device it is possible to transfer optical signals between a rotating element and an element remaining stationary relative to the first element.

With the fluorescent light being produced by spontaneous emission, which is induced in the fiber optical waveguide, the bandwidth of the optical signals to be transmitted is limited by the fluorescent life of the dyes in the fiber. If, however, there is the intention to receive optical signals at a maximum bandwidth possible without any loss of information there are limitations in the form of the known fluorescent dyes.

BRIEF DESCRIPTION OF THE INVENTION

The invention is based on the problem of improving a device for receiving optical signals, which comprises a light-guiding object into which the optical signal to be received may be coupled which is converted by means of a detector unit into electrical signals suitable for further processing, in a way that firstly the light transmission from the optical signals coupled into the light-guiding object to the detector means will take place along a path as direct as possible, without occurrence of a noticeable signal attenuation. In particular, it should be possible to permit the reception of optical signals within a maximum bandwidth possible, largely without loss. The optical signals should be received over the largest area possible, with the costs incurred thereby being kept as low as possible. The receiver should be suitable in particular for application in optical rotary transmitters.

The solution to the problem underlying the invention is defined in claim 1. Features improving the inventive idea in an expedient manner are the subject matters of claims 1 to 5. The claims 6 et seq. relate to an inventive use of the device for the optical signal transmission between two elements mobile relative to each other.

The invention starts out from the idea that the light-guiding object, which is provided for the reception of optical signals, is provided with a material having an electron array which can be inverted by energetic excitation and which, by way of stimulated emission, emits light at an emission wavelength which corresponds to the wavelength of the optical signals to be received. The inversion of the electron array is stimulated by an excitation unit, preferably by an optical pumped light source. A detector means is optically coupled to the light-guiding object for detection of the light which can be produced by the emission processes stimulated by the optical signals coupled into the light-guiding object. In accordance with the invention, the light-guiding object is made of a material, which is preferably synthetic and in which in response to light radiation at an angle between 0° and 90° relative to the irradiation surface a diffused light is produced within the material by elastic dispersion, with the wavelength of the diffused light corresponding to that of the irradiated light. What is essential is the aspect that the diffused light presents radiation components in the direction of a main propagation sense of the light-guiding object. This is to say that the light incident on the light-guiding object can be produced by dispersion processes of a radiation component within the light-guiding object, which is oriented in the direction in which the detector means is disposed. It is this radiation component, presenting the same wavelength as the optically incident signal, which is amplified by stimulated emission processes by the material present in the object and displaying a population inversion. The radiation generated during the amplification process presents not only the same wavelength as the generating radiation but also the same orientation, the same position in phase and the same polarisation. With the light amplification process taking place in response to stimulation, rather than spontaneously, and being stimulated directly by the light dispersed within the light-guiding object, the bandwidth is higher by several orders. It is possible in this manner to transmit the optical signals over the receiver means having an inventive configuration in a largely undistorted and amplified form to the detector means.

An essential aspect of the idea supporting the invention is the elastic dispersion of the incident light within the light-guiding object, which causes a deviation of diffused light also in a direction inside the material in which the detector means are disposed. In accordance with the invention it has been found that the share of elastically diffused light occurs in transparent synthetic materials in a particular strong form.

One specific potential application of the receiver device having the inventive configuration for the reception of optical signals is the field of optical rotary transmitters.

The afore-described light-guiding object designed in accordance with the invention is configured as a fiber optical waveguide along with which an emitter means is guided. The fiber optical waveguide may, for instance, have the shave shape of a circle along which an emitter means is displaced which is arranged on an element rotating relative to the fiber optical waveguide.

The material introduced into the fiber optical waveguide, wherein the electron population can be inverted, is optically excited, preferably by means of pumped lasers arranged at the ends of the fibers of the fiber optical waveguides, and changed over into an inverted population state in this manner.

The optical signals, which originate from the optical emitter means, are laterally radiated into the fiber optical waveguide which is made of synthetic material in which the light undergoes an elastic dispersion, with the original wavelength being retained. What is essential in this respect is the fact that radiation components are dispersed also in the axial direction of the fiber optical waveguide. This elastically diffused light is now amplified by induced emission over the entire periphery of the circle, so that amplified diffused light is emitted at the ends of the fiber optical waveguides, which has the same wavelength as the coupled-in optical signals. As the amplification is a process of induced emission there is no longer a limitation of the bandwidth, as this would be usual, on account of the restricted fluorescence life, in the known case operating on fluorescent dyes, so that the fiber optical waveguide ring designed in accordance with the invention presents a velocity higher by several orders, which means that optical signals with a high modulation frequency, too, can be received and appropriately evaluated without loss of information.

For the detection of the signal light applied at the ends of the fiber optical waveguides in an amplified form coupler elements are provided which are selective by wavelength and which ensure the optical decoupling of the pumped light from the joining detector means, which pumped light is required for the stimulation process, is produced by the pumped lasers, and has a wavelength different from the wavelength of the optical signals to be processed.

Apart from the specific application of the inventive device for the reception of optical signals for the field of optical rotary transmission, however, any number of further applications is conceivable. It is possible, for instance, to use the receiver system as position-sensitive and/or orientation-sensitive detector by measuring the signal transit times between the light coupling site and the detector units disposed on both ends of the fiber optical waveguide. The measurement of the signal amplitudes of the light waves propagating within the fiber optical waveguide serves the aforementioned potential detection applications, too, in addition to the measurement of the signal transit times.

DESCRIPTION OF THE PREFERRED EMBODIMENT

One embodiment of the inventive device, which is particularly well suitable for receiving optical signals for the application of optical rotary transmitters, is illustrated in the attached FIGURE.

The fiber optical waveguide, which is schematically indicated by the reference numeral 1 in the FIGURE and which is made of a synthetic material, is shaped so as to form a ring and corresponds to the receiving means for the light of an optical emitter unit moving opposite to the fiber optical waveguide, which emitter unit is not illustrated in the FIGURE. It is assumed that the emitter means couples an optical light signal into the fiber optical waveguide 1 at the site P, which light is then deviated by the aforedescribed elastic dispersion in both directions relative to the fiber axis. In the illustrated embodiment, the materials contained in the fiber optical waveguide 1 and presenting an inverted population are stimulated by optical excitation sources, e.g. a pumped laser PL, so that they contribute to the stimulated light amplification of the optical output signals which are deviated in the axial direction. Couplers WDM selective by wavelengths are provided for separating the signal light, which emerges at the ends of the fiber optical waveguides, from the pumped laser light.

The optical signals received in this manner may present bandwidths in the GHz range.

Although the invention has been described with reference to a particular arrangement of parts, features and the like, these are not intended to exhaust all possible arrangements or features, and indeed many other modifications and variations will be ascertainable to those of skill in the art.

The invention claimed is:

1. A device for receiving optical signals, comprising:
a stationary light-guiding object provided substantially in the form of a ring, said stationary light-guiding object having a lateral irradiation surface extending along a length of the stationary light-guiding object for receiving optical signals transmitted by a moveable stimulation unit and having a given wavelength, the irradiation surface extending along a propagation path along which light propagates within said light-guiding object, said light-guiding object including a material having an electron arrangement in which a population inversion is caused by an energetic excitation and in which a stimulation by the light of said optical signals causes an induced emission of light at the same wavelength and in the same direction as that of the optical signals, the light of the optical signals being thereby amplified;
a stationary excitation unit for emitting light to cause the population inversion in the material included in said light-guiding object;
a detector optically coupled to said stationary light-guiding object for detecting light having the wavelength of the optical signals;
a wavelength-selective element for filtering out light emitted by said stationary excitation unit from the light of the amplified optical signals to be detected by said detector;
wherein said light-guiding object is constructed of a material in which the light of the optical signals received through the irradiation surface at angles of between 0 and 90 degrees relative to the irradiation surface is diffused such that the diffused light has a component along the propagation direction of said light-guiding object; and wherein said moveable stimulation unit moves relative to said stationary light-guiding object to form a rotary optical receiving device.

2. A method for processing optical signals, comprising the steps of:

providing a stationary light-guiding object substantially in the form of a ring with a lateral irradiation surface extending along a length of the stationary light-guiding object for receiving optical signals transmitted by a moveable stimulation unit, the light-guiding object having a propagation path along which light propagates within the light-guiding means object, the light-guiding object including a material having an electron arrangement in which a population inversion is caused by an energetic excitation and in which a stimulation by the light of the optical signals causes an induced emission of light of the same wavelength and direction as that of the optical signals, the light of the optical signals being thereby amplified;

causing a population inversion in the material included in the light-guiding object using stationary excitation unit, and receiving an optical signal in the stationary light-guiding object through the irradiation surface;

filtering out with a wavelength-selective element the light of the stationary excitation unit from the light of the optical signals which have been received by the stationary light-guiding object and amplified by induced emission of the stationary light-guiding object;

detecting with a detector the amplified optical signals from which the light of the stationary excitation unit has been filtered out;

wherein the light-guiding object has been selected to be constructed of a material in which the light of the optical signals received through the radiation surface at angles of between 0 to 90 degrees relative to the irradiation surface is diffused such that the diffused light has a component along the propagation direction of the light-guiding object; and wherein said moveable stimulation unit moves relative to said stationary light-guiding object to form a rotary optical receiving device.

3. A method for receiving optical signals according to claim 2, wherein the light-guiding object is a stationary fiber-optical waveguide and has a detector at one end, and the emitted optical signals are continuously received by the stationary light-guiding object during the rotation of the rotating moveable stimulation unit.

4. A method for receiving optical signals according to claim 2, wherein a detector is disposed at each end of the waveguide, and the position of the source of optical signals is determined by measuring the signal transit times to each detector.

5. A method for receiving optical signals according to claim 2, wherein a detector is disposed at each end of the waveguide, and the position of the source of optical signals is determined by measuring the signal intensities at each detector.

6. A device for processing optical signals, comprising:

a moveable stimulation unit for emitting light;

a stationary light-guiding object provided substantially in the form of a ring and including:

an irradiation surface extending along a length of said stationary light-guiding object for laterally receiving optical signals at angles of between 0 and 90 degrees relative to the irradiation surface;

a propagation path located adjacent to the irradiation surface;

a material having an electron arrangement in which a population inversion may be caused by an energetic excitation and in which an emission of light, at a wavelength corresponding to the wavelength of the received optical signals, may be induced along the propagation path and where the received optical signals are diffused such that they have a component along the light propagation path;

a detector optically coupled to said stationary light-guiding object for detecting light having a wavelength corresponding to the wavelength of the received optical signals;

a wavelength-selective element for filtering out light not corresponding to the wavelength of the received optical signals to be detected by said detector; and wherein said moveable stimulation unit moves relative to said stationary light-guiding object to form a rotary optical receiving device.

* * * * *